United States Patent [19]

Vignon et al.

[11] Patent Number: 4,572,705
[45] Date of Patent: Feb. 25, 1986

[54] REVETMENT OF CELLULAR TEXTILE MATERIAL

[76] Inventors: Jean F. B. J. Vignon, 16, quai des Moulins, Sète 34200; Christian Tabouy, 6, rue des Tilleuls, 34970 Lattes, both of France

[21] Appl. No.: 153,826

[22] Filed: May 27, 1980

[51] Int. Cl.$^4$ .......................... E02B 3/12; E02D 17/20
[52] U.S. Cl. ........................................ 405/16; 405/258
[58] Field of Search ...................... 405/15, 16, 19, 32, 405/258; 24/255 R

[56] References Cited

U.S. PATENT DOCUMENTS

| | | | |
|---|---|---|---|
| 647,322 | 4/1900 | Newburg | 405/16 |
| 1,905,176 | 4/1933 | Kieckhefer | 405/15 X |
| 3,797,076 | 3/1974 | Watkin | 24/255 R |
| 3,962,758 | 6/1976 | Knappe et al. | 24/255 R |
| 4,002,034 | 1/1977 | Muhring | 405/19 |
| 4,090,337 | 5/1978 | Szekeres | 405/19 X |
| 4,142,821 | 3/1979 | Doring | 405/258 |
| 4,181,450 | 1/1980 | Rasen et al. | 405/19 |

FOREIGN PATENT DOCUMENTS 8799 of 1913 United Kingdom ................ 405/258

Primary Examiner—David H. Corbin
Attorney, Agent, or Firm—Karl F. Ross; Herbert Dubno

[57] ABSTRACT

Textile sheets of a cellular structure assure the consolidation of the soil, and at the same time, its improvement by drainage. They are formed by strips of imputrescible textiles, woven or not woven, joined together in such a manner as to form a net of the honeycomb type, which can receive in its cells materials of every kind. These materials contribute in rendering rigid the aforesaid cellular sheets, and to the immobilization of the adjacent soil, in relation to its upper and lower layers, thus also reinforcing the soil with an actual armature. The invention can be utilized in public, maritime or agricultural works, for distribution of loads, for blocking of surfaces and slopes, to prevent the creeping of unstable infrastructures of roads, to drain and strengthen the slopes and create beds.

3 Claims, 9 Drawing Figures

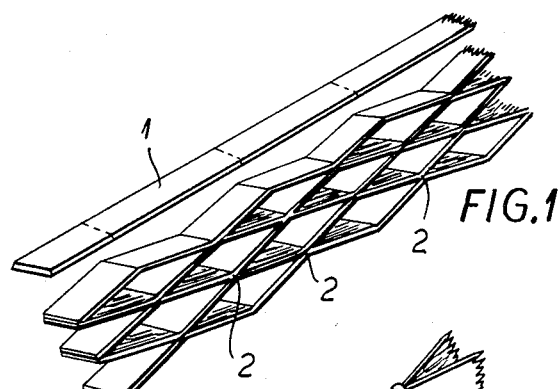
FIG.1
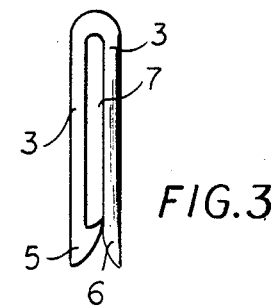
FIG.3
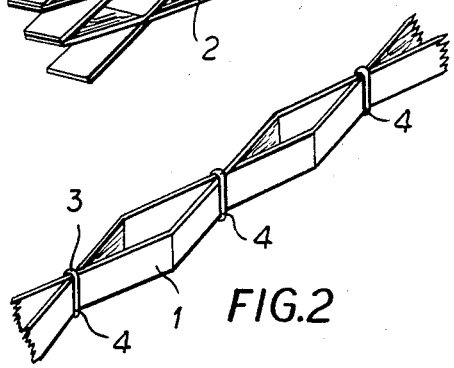
FIG.2
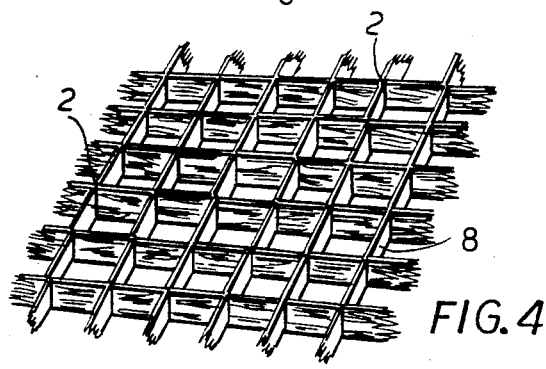
FIG.4
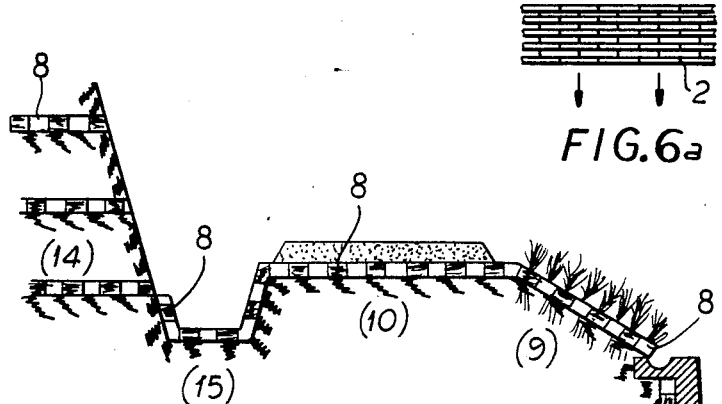
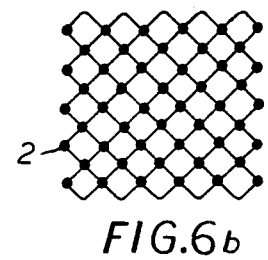
FIG.6a
FIG.6b
FIG.5
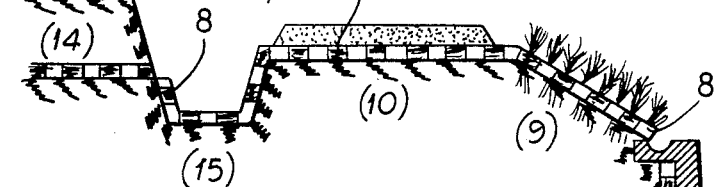
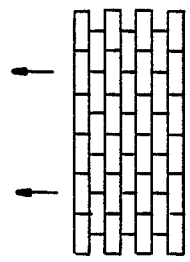
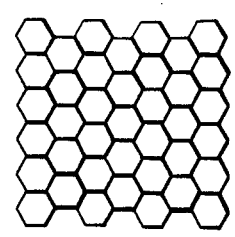
FIG.7a    FIG.7b 4,572,705

REVETMENT OF CELLULAR TEXTILE MATERIAL

FIELD OF THE INVENTION

This invention relates to a device for the consolidation and the improvement of the soil on the surface and in depth with the aid of permeable textile materials, i.e. to a revetment or the like.

BACKGROUND OF THE INVENTION

To improve the soil by promoting internal drainage, or in order to assure the longevity of existing drains and avoiding their warping, there are in existence sheets of continuous textile fibers, imputrescible, woven or not woven which are used in covering the zones to be improved. Some of these sheets constitute good drainage and filtration elements as well as, in certain cases, a means for the distribution of loads. In cases when these sheets form, or are placed to form, a heterogenic ensemble, the friction coefficient between layers is not always sufficient to avoid full displacement of a layer of soil relative to the layers. Furthermore, such sheets require generally a horizontal placement, or to be placed on relatively slight slopes which do not possess any natural means of anchorage. Finally, whatever their situation, the sheets must always be covered with shaping materials, because by themselves they do not contribute to the stability of the structure. The goal sought is, in effect, the conservation of the structure not by mechanical consolidation, but by soil improvement and by the better distribution of loads from one part to another part. Properly speaking, these two results contribute together to safeguard the structure but without having it consolidated.

SUMMARY OF THE INVENTION

The device of this invention, from the point of view of improvement of soil, has the same advantages. But in addition, it presents a very important advantage, namely, of contributing by itself to the effective and efficacious consolidation of the soil. This occurs when it is installed on the surface, even without being covered with a shaper, or while being introduced into the soil, leading to the drains or acting as a drain. The device of the invention, offers, moreover, the advantage of being manufactured very easily. In effect, while the sheets of textile fibers actually used in public works are made in very large widths (on the order of 5 meters), which require very large manufacturing equipment, the device of the invention presents in the form of imputrescible woven or nonwoven strips of textile fibers of a small width. The strips are arranged in a way that will be indicated later to form honeycomb webs of a height equal to the width of the aforesaid strips. This requires only very modest manufacturing equipment.

According to the invention these strips of woven or nonwoven textile fibers are arranged in the form of cellular layers of a honeycomb pattern in which the depth of each cell is equal to the width of the utilized strips.

The honeycombed sheets can be formed by placing each strip in succession parallel to the strip or proceeding strips, and joining each strip to the immediately adjacent strip by any means, not at all its surface, but on equidistant points and alternating with each other strip.

The means of joining the strips to each other can include stitching, riveting, hooking or gluing, the glue being placed on the equidistant points and the following strip being applied on it, coat after coat. The glue is applied anew on the new strip also at equidistant points and alternated in relation to the preceeding strip. Attachment can also be achieved by thermic soldering with the aid of any suitable equipment, or by setting up in an alternating way metallic or plastic staples, which immobilize two adjacent strips at two equidistant and alternating points.

BRIEF DESCRIPTION OF THE DRAWING

In the drawing:

FIG. 1 is a partial schematic view showing assembly of the object device of the invention, using stitching, gluing or soldering;

FIG. 2 is a partial schematic view of the same device produced by setting up staples;

FIG. 3 is a schematic view of such a staple;

FIG. 4 is a schematic view of the device ready to be placed;

FIG. 5 is a sectional schematic view representing simultaneously several of the principal applications of the object of this invention, in public works, for example;

FIGS. 6a and 6b are schematic views of a manufacturing technique (a) and the product thus obtained (b), presenting in a quadrilateral form; and FIGS. 7a and 7b are schematic views of manufacturing technique (a) and the obtained product, in a hexagonal form.

From what has been represented, (FIG. 1) one can ascertain that the device is formed of relatively thick textile strips 1, woven or nonwoven, applied one on the other and bonded to each other at equidistant points 2, offset from one strip to the other, either by glue, solder, perforations, hooking or by any other similar means. This binding can be obtained also (FIG. 2) by means of staples 3, (FIG. 3) put in place at each of the joining points 4. These staples are made preferably of an nonoxidizable metallic or plastic hairpin structure which enables one to insert in it two thicknesses of strips. The free end of one arm has the form of a hook 5, turned towards the interior of the slit. That hook ends in the form of a barb; it presses upon the opposing lip. This lip is formed as an entrance ramp 6. Thus, this hook will be easily placed astride on two adjacent strips which will be immobilized in that position by the hook 5, which will penetrate the textile and will prevent the removal of the textile.

In each one of these cases, the sheets, in the form of a grid, will form quadrilateral cells after deployment.

It can be also foreseen that the strips will be bound to each other by the reciprocal interpenetration of the fibers of one strip to the adjacent strip. This applies to the woven or non woven strips. Such binding is represented in FIG. 7a. In similar cases, the cells of the honeycombed sheets thus formed will be hexagonal in form (i.e. honeycomb), comparable more or less to a regular hexagon, following the length of the intervening binding (FIG. 7b).

Such sheets naturally are filtering and draining, because they are made of either woven or nonwoven textile fibers. Above all while being united with each other, each sheet stands out edgewise. These sheets form cells whose height depends on the width of the used strip. This allows the creation of relatively deep cells, which by virtue of the rigidity given to them, can in turn confer on the filtering device the possibility of consolidating the soil where these devices are applied, without the device itself necessarily being rigid.

The total assembly of the open cells created this way, can be filled by such diverse materials as: sand, gravel, limestone or clayish earth. They can contain hydraulic or bituminous binders. It has the advantage of being made with ease and the ability of being put into play with materials which may not offer any proper cohesion with each other. Another advantage is that it can be used with block surfaces, which can by themselves oppose creeping under the pressure which they receive from the immobilization of materials contained in the network formed this way, notwithstanding the draining and filtering qualities which are maintained on the level of the membranes.

Such qualities allows new and numerous usages in many diverse situations which extend to the vertical position. Certain of these diverse possibilities are shown in a no restrictive way by FIG. 5.

One can see, in position 9, a cellular sheet, the object of the invention, used to assure the blocking of a slope, when the device is placed on the surface. It is filled with any material, which may be sand, the same sand which forms the slope itself.

The cellular sheets thus hinder in an effective way erosion by wind or flowing waters. Besides, unlike continuous textile sheets, they have the advantage of permitting intercellular germination. This contributes more to the blocking of the slope or the dunes on whose surface these sheets are simply installed.

The blocking of materials contained in these cellular sheets is such that it opposes the creeping of sand under the pressure which can be vertically excercised on these sheets. This in turn permits their installation as a bed for a road structure on sand represented at 10 and permits the support of a type of road which will be naturally stabilized. The draining qualities of the device assure the permanent outflow of infiltration waters from the roadway.

The filtration and drainage qualities of these cellular sheets are particularly illustrated at 11, in which they are used vertically in a trench, each of the sheets being itself filled with sand. They can thus lead to the lower outflow drains 12.

This draining quality allows it to be utilized for drainage of waters behind a retaining wall (see position 13). The infiltration water of a higher slope thus will be conducted to an outflow conduit which is situated at the base of the wall and either on the interior or the exterior side of the wall.

Their qualities of drainage and reinforcement are utilized simultaneously at 14. Here the sheets are placed with a very slight inclination towards the front of the slope for its reinforcement, which is constituted by the successive layers of earth intercalated in the cellular sheets which are filled preferably with sand.

Finally this device also offers the possibility of superficial blocking, which is used for the rapid construction of beds for outflow channels or canals (at 15), whatever the dimensions of these channells may be. The cells of the device are filled with a hydraulic binding or bituminous mixture, the placing of which is facilitated by mechanic immobilization, which is immediately achieved by the presence of the honeycomb network.

Such a bed withstands erosion in a very effective way, thanks to the armature created by this network, and can accept a waterproofed finishing coating if necessary.

In the same manner this device can be utilized for constructing the coping for roads or sidewalks, whose superficial coat will be permeated in a manner to assure the permanent outflow of rainwater through the above mentioned coat and then drained by the underlying network.

It is understood that the extent of the invention is not limited to one example or to all examples for realization which have been described. Any variant considered as equivalent can not modify its change.

It is noted as well that in most of the considered applications, the textile fibers, woven or nonwoven are used without preparation. This allows total flexibility to the strip and therefore to the sheet. But it is foreseen that in certain applications, principally when the sheets are used vertically, the textile fibers can be coated with a fine layer of synthetic resin or any other similar product. This is done after adequate thermic treatment and applied while the sheet is spread out in the honeycomb form in order to permit an adherence between the constitutive fibers of the strips. This adherence renders all the fibers, and hence, the entire sheet, perfectly rigid, while conserving the empty spaces between the fibers. This in turn maintains the quality of the drainage. The sheets thus formed can be used vertically without the use of intercellular materials. This is the case which can be applied in 13 for the drainage of a retaining wall.

This invention can be utilized for all constructions which require the consolidation or the blocking of land surfaces, and at the same time, for their improvement by drainage, principally in public, maritime or agricultural works.

We claim:

1. A revetment for stabilizing a ground structure, comprising:
    a grid layer formed by porous planar continuous textile-fiber strips of non-decomposable material joined together at spaced-apart locations to define open pockets of regular hexagonal shape between said strips which are open on opposite sides of said layer, said strips being of uniform thickness over their entire lengths; and
    porous mineral matter filling said pockets, each of said strips having its transverse width perpendicular to the plane of said layer and uniform over its entire length whereby the thickness of said layer is equal to the width of said strips.

2. The revetment defined in claim 1 wherein said strips are joined together at said locations by staples of non-oxidizing material and of hairpin configuration with one arm of each staple formed with an inwardly turned bar adapted to pierce said strips, and the other arm of each staple being formed with a ramp enabling insertion of two strips into the staple between the arms thereof.

3. The revetment defined in claim 1 or claim 2 wherein said strips are formed of textile fibers coated with a material fusible at a higher temperature than ambient temperature but less than the thermal distortion temperature of said strips.

* * * * *